United States Patent [19]

Otterstedt et al.

[11] Patent Number: 4,515,903

[45] Date of Patent: May 7, 1985

[54] CRACKING CATALYST

[75] Inventors: Jan-Erik A. Otterstedt, Surte; Sven G. Järås, Kungälv; Roland Pudas, Nödinge; Lawrence L. Upson, Gothenburg, all of Sweden

[73] Assignee: Katalistiks B.V., Delfzijl, Netherlands

[21] Appl. No.: 581,272

[22] Filed: Feb. 17, 1984

Related U.S. Application Data

[63] Continuation of Ser. No. 349,087, Feb. 12, 1982, abandoned.

[30] Foreign Application Priority Data

Jun. 30, 1980 [SE] Sweden ............................ 8004825

[51] Int. Cl.$^3$ .......................... B01J 29/06; B01J 33/00
[52] U.S. Cl. ........................................ 502/68; 502/69; 502/521
[58] Field of Search ................ 502/68, 69, 516, 521; 208/120; 423/244 R

[56] References Cited

U.S. PATENT DOCUMENTS

| | | | |
|---|---|---|---|
| 2,651,600 | 9/1953 | Taff et al. ............................. | 208/152 |
| 4,151,121 | 4/1979 | Gladrow .......................... | 502/69 X |
| 4,240,899 | 12/1980 | Gladrow et al. ............... | 423/244 X |
| 4,285,806 | 8/1981 | Mooi ............................... | 423/244 X |
| 4,325,811 | 4/1982 | Sorrentino ...................... | 423/244 R |
| 4,442,223 | 4/1984 | Chester et al. ...................... | 502/68 |
| 4,465,779 | 8/1984 | Occelli et al. .................... | 502/68 X |

Primary Examiner—Carl F. Dees
Attorney, Agent, or Firm—Luedeka & Neely

[57] ABSTRACT

A cracking catalyst having good resistance to metal poisoning has at least two particle fractions of different particle sizes, the cracking catalyzing zeolite material being concentrated to the coarser particle size fractions, and the finer particle size fractions being formed from material having relatively lower or no or insignificant cracking catalyzing activity. The particles of the finer particle size fractions have a matrix of kaolin and amorphous alumina-silica and may contain for example, an $SO_x$ eliminating additive such as $Al_2O_3$, CaO and/or MgO. The coarser particle size fractions having cracking catalyzing effect have a mean particle size of from 80 to 125 $\mu$m and the finer particle size fractions a mean particle size of from 30 to 75 $\mu$m. The coarser particle size fractions have a zeolite content of at least 20 weight % and may have a zeolite content of up to 100 weight %, the remainder consisting essentially of material which has relatively lower or no or insignificant cracking-catalyzing activity and which consists of kaolin and amorphous alumina-silica. The catalyst mass as a whole may have a zeolite content of up to 50 weight %.

9 Claims, 1 Drawing Figure

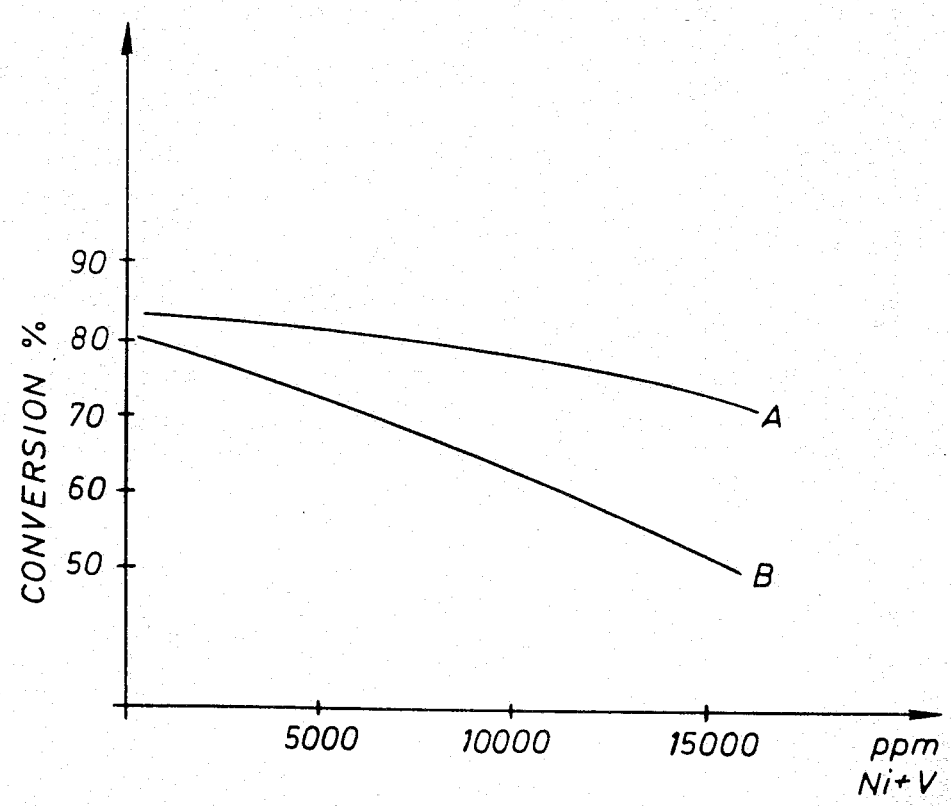

CRACKING CATALYST

This application is a continuation of application Ser. No. 349,087, filed on Feb. 12, 1982, and now abandoned.

A fluidized catalyst bed is often employed in the cracking of hydrocarbons. The hydrocarbons are fed through the bed in order to be brought into contact with the catalyst particles in the catalyst bed. In such an instance, the catalyst is particulate having a particle size and particle size distribution suitable for the contemplated purpose and for the fluidization. As a cracking catalyzing component the catalyst contains zeolite material which is combined with material which is relatively less active or inactive as regards a cracking catalyst effect The literature in this art abounds with descriptions of how such catalysts may be prepared, and mention here might briefly be made that prior art catalysts are often prepared by intermixing silica, kaolin, sulfuric acid, aluminum salt and previously prepared NaY-zeolite to a mixture which is spray-dried, washed with water, ion-exchanged with ammonium sulfate, washed with water ion-exchanged with rare earth metal chlorides, washed with water, dried and finally calcined.

A vital problem involved in the use of catalysts for cracking in a fluidized bed is the metal contamination or poisoning to which the catalyst is exposed since this contamination entails reduced product yield (gasoline) and increased production of coke and gas and can, therefore, require replacement of the catalyst.

One object of the present invention is, therefore, to improve the ability of prior art catalysts to resist metal contamination. A further object is to provide a novel cracking catalyst which is heterogeneous and is selective for the production of gasoline.

The above objects as well as other objects appearing from the following description are obtained if the cracking catalyst according to the invention comprises particle fractions of different particle size and different chemical composition, the cracking catalyst component constituting the coarser particle size fractions, and at least the major portion of the material which is relatively less active or inactive in cracking catalyzing respect being of finer particle size fractions.

The attached drawing is a diagram showing test results obtained in Example 4 below.

The cracking catalyst according to the invention displays a good level of resistance to metal contamination or poisoning as a result of the fact that the cracking catalyst is formed from at least two particle fractions of different particle size ranges, the zeolite material acting as cracking catalyst being concentrated to the coarser particle size fractions, and the finer particle size fractions being formed from a material which is relatively less active in cracking catalyzing respect or has no or insignificant cracking catalyzing activity. The particles of the fine particle size fractions have a matrix of kaolin and amorphous aluminasilica or aluminosilicate and can, in preferred embodiments of the invention, contain, for example, $SO_x$ eliminating or picking-up additives such as one or more oxides of calcium, aluminum and magnesium. Preferably, the coarser particle size fractions having a cracking catalyzing effect have a mean particle size of from 80 to 125, preferably from 80 to 100 μm, and the finer particle size fractions a mean particle size of from 30 to 75, preferably from 30 to 60 μm. The relative proportions of coarser to finer particle size fractions are such that the catalyst as a whole will have a particle size distribution which is suitable for fluidizing purposes. The relative contents of the coarser and finer particle size fractions have also been selected for attaining a total content of zeolite material in the catalyst which is suitable for the cracking process. The particles of the coarser particle size fraction preferably have a zeolite content of at least 20 weight% and up towards 100 weight%, the remainder consisting of material which is relatively less active in cracking catalyzing respect or has no or insignificant cracking catalyzing activity and may consist of kaolin and amorphous alumina silica or aluminosilicate.

As a whole, the catalyst may have a total zeolite content of up to 50 weight%.

In conjunction with the cracking of hydrocarbons in a fluidized bed, it is known to employ a catalyst mixture of catalyst particles of different particle sizes, activities, selectivities and coke generating properties. This is described in U.S. Pat. No. 4,116,814 (Sept. 26, 1978), where the catalyst combination serves, during one and the same cracking process, to act upon separate, relatively high boiling hydrocarbon fractions varying considerably in coke producing characteristics and/or catalyst fouling characteristics. Thus, this U.S. patent describes a combination treatment in which different catalysts are admixed in dependence upon the composition of the raw material flow, and in which the raw material is cracked in two reactors, the particle size ranges of the catalyst in the reactors being different. This U.S. patent describes another solution of the metal poisoning problem than the present invention in that the use of smaller particles of low activity in a separate guard chamber is suggested to entrap metal contaminants and thus to provide a more desirable hydrocarbon feed for the main reactor containing high activity catalyst particles. Thus, the present invention isnot described or suggested in this U.S. patent, since the present invention is based on the realization that it is possible, in a catalyst with particle fractions of different particle sizes, to increase the resistance capacity of the catalyst to metal contamination if the major catalytic cracking effect is concentrated to the coarser particle size fractions and if the finer particle size fractions are formed from a material which is less active or inert, or almost inert, from the point of view of cracking. When using the catalyst according to the present invention, the cracking is contemplated to take place in a sole reactor in which all of the size fractions are present at the same time.

U.S. Pat. No. 2,651,600 (Sept. 8, 1953) discloses a method of reducing contaminants on a finely divided catalyst having a homogeneous composition, in which method the finer fractions of the catalyst are continuously removed from the reactor to remove the catalyst particles having the highest degree of metal poisoning. The U.S. patent does not disclose the present invention according to which the catalyst material having the highest cracking catalyzing activity should be concentrated in the coarser particle fractions of the catalyst while the finer particle fractions are formed from a material being relatively less active or having no or insignificant activity in cracking catalyzing respect.

Another method of reducing the metal poisoning problems in the catalytic cracking of hydrocarbon feedstocks is disclosed in U.S. Pat. No. 3,409,541 (Nov. 5, 1968). In this patent it is suggested to introduce into the reactor together with the catalyst a finely divided reactive material being capable of reacting with metal contaminants in the hydrocarbon feed under the cracking conditions and of forming together therewith a sintered product which at a later stage is removed from the catalyst circulating in the reactor. Thus, this prior art method is based on another technical concept than the present invention and teaches away therefrom.

U.S. Pat. No. 3,597,349 discloses a two-component catalyst containing discrete particles of two different catalyst materials having high catalyzing activity, one component comprising an ultrastable, large-pore crystalline alumino-silicate material in a matrix of an amorphous silica-alumina and metals of groups VI-A and VIII of the Periodic Table of elements, and the other component comprising cation-exchanged Y-type molecular sieves. In this prior art specification there is no disclosure of the present invention providing a two-component catalyst, the coarser particle fractions of which have a high cracking catalyzing activity, and the finer particle fractions of which have a relatively lower cracking catalyzing activity or no or relatively insignificant cracking catalyzing activity, and which has an increased resistance to metal poisoning due to its heterogeneous composition.

Printed UK patent specification GB No. 2,023,639-A discloses a cracking catalyst having two different types of catalyst material having different particle sizes to enable a separation of the different types of catalyst material after use of the catalyst. This prior art specification does not disclose the present invention, i.e. that the catalyst material of higher cracking activity should be concentrated to the coarser particle fractions. Neither does it describe or suggest that metal poisoning problems in cracking catalysts may be reduced by such a distribution of materials in the catalyst mass.

Printed UK patent specification GB No. 2,032,947-A discloses a catalyst having particles of different materials to bring about an effective elimination of sulfur oxides. Neither does this specification suggest the contemplated catalyst of a special heterogeneous composition according to the present invention.

The reasons behind the improved resistance capacity to metal contamination of the catalyst according to the present invention have not been fully investigated, but at the present time it is believed that metal contamination is caused by a covering of the catalyst material with metal, and that, because of the coarser particle size, the metal contamination layer on the particles may become thicker before the catalyzing effect ceases entirely. Since the cracking-active material has been concentrated to the coarser particles, these particles will, for a given level of activity in the catalyst mass as a whole, have a higher zeolite content than is the case in conventional cracking catalysts having their catalytic material distributed in both coarse and fine particle size fractions. Thus, the coarser particle size fractions have a higher content of zeolite material in order to compensate for the absence of zeolite material in the finer particle size fractions. The relative metal contamination resistance capacity is believed to be equal to the relationship between volume and specific surface area of the coarser particle size fractions and of the normal, prior art catalysts for cracking in a fluidized bed. Furthermore, it is believed that the higher zeolite content in the thin jacket which is created close to the surface of the particles of the coarse particle size fraction where the metals are entrapped allows for the entrapment of more metal than is the case in prior art catalysts. This would consequently increase the resistance capacity of the present catalyst to metal contamination. This improved resistance capacity to metal contamination in the catalyst according to the present invention as compared with prior art catalysts for fluidized bed cracking is thus believed to depend upon a physical factor, namely the larger particle size of the active catalyst particles, and a chemical-physical factor, that is to say the higher zeolite content in these coarse, catalytically active particles.

One great advantage of the catalyst according to the present invention is that the coarser fractions and finer fractions have substantially the same abrasion resistance capacity because the matrix in the discrete particles is the same in both cases, namely kaolin and amorphous alumina-silica or aluminosilicate, there having been added zeolite material to the matrix of the particles in the coarser particle size fractions and possibly an $SO_x$ eliminating or picking-up additive (for example $Al_2O_3$, CaO and MgO) to the matrix of the particles in the finer particle size fractions. According to the invention, the finer particle size fractions may also be impregnated with other chemical substances for particular functions, for example platinum or palladium for complete CO combustion.

The invention and the different aspects and objects thereof will be described in greater detail below by means of Examples in which Examples 1 and 2 relate to preliminary tests for illustrating the different capacities of coarse and fine paticle size fractions to withstand metal contamination or poisoning.

EXAMPLE 1

A conventional cracking catalyst for cracking of hydrocarbons in a fluidized catalyst bed was prepared by the following steps: silica, kaolin, sulfuric acid, aluminum sulfate and a previously prepared zeolite NaY were intermixed, spray-dried, washed with water, ion-exchanged with ammonium ions, washed with water, ion-exchanged with rare earth metal ions, washed with water, dried and calcined. The relative proportions and treatment steps were such that the fresh catalyst had the following composition and properties:

| Composition | | |
|---|---|---|
| | $SiO_2$ | 62.9 weight % |
| | $Al_2O_3$ | 32.0 weight % |
| | $RE_2O_3$ | 3.1 weight % |
| | $Na_2O$ | 0.65 weight % |
| | $K_2O$ | 0.6 weight % |
| | $SO_4$ | <0.5 weight % |
| | Fe | 0.3 weight % |
| | | 100.1 weight % |
| apparent powder density | | 0.65 g/cm$^3$ |
| pore volume (excl. extern porosity) | | 0.26 ml/g |
| mean particle size | | 60 μm |
| particle size range | | 20-150 μm |
| specific surface area | | 110 m$^2$/g |

This catalyst was used for cracking a gas oil in a commercial cracker. The density of the gas oil employed was 0.920 g/cm$^3$, its 50% boiling point was 389° C., its sulfur content was 1.43% and its metal index was 7.0%. The catalyst was utilized for more than a month for cracking under normal cracking conditions, the conversion being 62%, the weight ratio of catalyst to oil was 6.6:1 and the temperature was 495° C. in the reactor of the cracker. Thereafter, samples were taken from the catalyst, the coke was burnt off and the samples were screened into a finer particle size fraction of a mean particle size of 75 μm and particle size range of from 60 to 80 μm, and a coarser particle size fraction having a mean particle size of 125 μm and a particle size range of from 100 to 150 μm. The two fractions were analysed for their contents of nickel and vanadium. The analysis results were as follows:

|  | Coarse fractions | Fine fractions |
|---|---|---|
| Ni content, ppm | 190 | 310 |
| V content, ppm | 580 | 1070 |

As will be apparent from the above analysis of the metal contents of the coarser and finer fractions, the coarser fraction has a higher resistance to metal contamination than the finer fraction at identical conversion conditions.

The selectivity of the fresh catalyst for gasoline production was investigated by a Micro Activity Test (MAT) according to the ASTM Subcommitte D-32.04, the following result being obtained after water vapor treatment in 100% vapor at 750° C. for different periods of time.

|  | Vapor-treated | | |
|---|---|---|---|
|  | 3 h | 18 h | 42 h |
| conversion weight % | 74.1 | 70.5 | 670 |
| gasoline weight % | 56.0 | 54.1 | 52.3 |
| coke weight % | 2.5 | 2.05 | 1.65 |
| gas weight % | 15.0 | 14.3 | 13.0 |

The two catalyst fractions were also subjected to MAT examination separately, that is to say these catalyst fractions had previously been on stream for more than a month. The result of the MAT examination with the two fractions was as follows:

|  | Coarse fractions | Fine fractions |
|---|---|---|
| conversion weight % | 69.1 | 65.7 |
| gasoline weight % | 53.3 | 50.5 |
| coke weight % | 2.3 | 2.3 |
| gas weight % | 13.5 | 13.0 |

It will be apparent from these experiments that the coarser fraction had a higher degree of selectivity for gasoline production and gave a higher conversion than the finer fraction, which may probably be explained by the lower metal content and thus the lower degree of metal poisoning of the coarser fraction.

EXAMPLE 2

Example 1 was repeated with a further batch of the same catalyst, this batch being run at more severe cracking conditions. Instead of the gas oil used in Example 1, the gas oil of Example 2 had a density of 0.915 g/cm$^3$, a 50% boiling point of 392° C., a sulfur content of 1.96 weight% and a metal index of 9.6. During the cracking, the conversion was 64%, the weight ratio of catalyst to oil was 6.6:1 and the temperature was 495° C. in the reactor of the cracker. After being used for cracking, the catalyst was divided into two fractions in accordance with Example 1, whereafter the coarser and finer fractions were analysed for their Ni and V contents. The analysis results were as follows:

|  | Coarse fractions | Fine fractions |
|---|---|---|
| Ni content, ppm | 250 | 320 |
| V content, ppm | 880 | 1140 |

This preliminary investigation confirmed the observation which was made in Example 1, namely that the coarser particle size fractions of the catalyst mass had a better ability to withstand metal than the finer.

EXAMPLE 3

By mixing silica, zeolite NaY, kaolin, sulfuric acid and aluminum sulfate and spray drying the mixture, a catalyst material was prepared which contained from 25 to 30% zeolite Y, the remainder being amorphous alumina-silica and kaolin. From the obtained catalyst material, particles which was smaller than 80 μm and larger than 100 μm were separated by screening. The remaining particles which were in the size range of from 80 to 100 μm and which were to form the coarse fraction of the contemplated catalyst were then subjected to careful ion exchange first with ammonium ions and subsequently with rare earth metal ions. The final product was carefully washed with water and dried.

For intermixing with the above-mentioned coarse fraction, a fine particulate fraction was prepared which contained from 25 to 35% CaO. The preparation of this fraction was carried out by adding CaO powder to a slurry of kaolin and amorphous alumina-silica (the same as was utilized in the preparation of the coarse fraction), followed by spray drying of the mixture in a small spray drier. Particles which were smaller than 30 μm and larger than 60 μm were removed from this spray-dried product by screening. An amount of 15 kg of the thus obtained powder was mixed with 15 kg of the coarse fraction prepared in accordance with the above so as to form a catalyst. The thus prepared catalyst with coarse particles of high cracking activity and fine particles of relatively lower cracking activity had the composition illustrated under col. II in Table 1.

A further coarse-particulate catalyst component was prepared in the manner disclosed above for coarse fractions, and thereafter a fine-particulate catalyst component was prepared having the above-disclosed composition with the exception that the calcium oxide was replaced by aluminum oxide. These two fractions were intermixed to form a catalyst in which the most cracking-active material was concentrated to the coarse-particulate fraction. The analysis of the finished catalyst is apparent from col. I in Table 1.

Finally a third catalyst was prepared in the same manner as the above catalyst II, with the exception that the calcium oxide was replaced by magnesium oxide. The analysis of the thus prepared catalyst is disclosed under col. III in Table 1.

TABLE 1

|  | Catalyst analysis (weight %) | | |
|---|---|---|---|
|  | I | II | III |
| SiO$_2$ | 46.1 | 47.6 | 47.6 |
| Al$_2$O$_3$ | 46.8 | 29.4 | 29.4 |
| RE$_2$O$_3$ | 4.6 | 3.4 | 3.4 |
| Na$_2$O | 0.91 | 0.73 | 0.73 |
| K$_2$O | 0.67 | 0.51 | 0.51 |
| SO$_4$ | 20.6 | 20.6 | <0.6 |
| Fe | 0.3 | 0.3 | 0.3 |
| CaO | — | 17.5 | — |

TABLE 1-continued

| | Catalyst analysis (weight %) | | |
|---|---|---|---|
| | I | II | III |
| MgO | — | — | 17.5 |

The three above-disclosed catalysts I-III and the original freshly prepared catalyst according to Example 1 were tested as regards their $SO_2$ absorption capacity. The test was carried out at 680° C. or 720° C., a mixture of air and 1000 ppm of $SO_2$ at the disclosed temperature being blown through a catalyst batch until a state of equilibrium had been reached which required roughly 3 min. The result of this test is apparent from Table II in which "standard" relates to the unchanged or original catalyst prepared in Example 1, in which all particles in the catalyst mass were cracking-active and had the same composition.

TABLE 2

| | $SO_2$ absorption capacity (weight %) | |
|---|---|---|
| | 680° C. | 720° C. |
| Standard | 3.7 | 4.5 |
| Catalyst I | 5.9 | — |
| Catalyst II | — | 12.5 |
| Catalyst III | — | 9.4 |

It will be apparent from the above Table 2 that the standard catalyst displayed a certain $SO_2$ absorption capacity and that catalyst I had a slightly higher $SO_2$ absorption capacity. The marked improvement was attained, however, in catalysts II and III, in which particular additives in the form of CaO and MgO, respectively, had been provided for in order to increase the $SO_2$ absorption capacity. The absorption capacity displayed by the standard catalyst and by catalyst I probably depends upon the presence of $Al_2O_3$ in the catalyst.

In order to test and compare the cracking capacities and aging resistance capacities of the catalyst composed according to the invention, catalyst II and the standard catalyst (i.e. the catalyst according to Example 1 prior to division into a coarse and a fine fraction) were subjected to vapour treatment with 100% water vapor at a temperature of 750° C. for 3 hours, 18 hours and 42 hours, respectively, for three different catalyst batches. After the water vapor treatment, the treated catalyst samples were subjected to MAT examination. In this examination, the following results were obtained.

TABLE 3

| | MAT-examination | | | | | |
|---|---|---|---|---|---|---|
| | Catalyst II vapor-treated | | | Standard catalyst vapor-treated | | |
| | 3 h | 18 h | 42 h | 3 h | 18 h | 42 h |
| conversion weight % | 78.6 | 71.0 | 66.1 | 74.1 | 70.5 | 67.0 |
| gasoline weight % | 55.7 | 53.5 | 52.8 | 56.0 | 54.1 | 52.3 |
| coke weight % | 4.3 | 2.4 | 1.6 | 2.5 | 2.05 | 1.65 |
| gas weight % | 18.5 | 15.2 | 11.7 | 15.9 | 14.3 | 13.0 |

It will be apparent from Table 3 that catalyst II behaves substantially in the same manner as the standard catalyst as regards cracking capacity and resistance to aging.

In order to compare attrition resistance, catalyst II and the standard catalyst were subjected to an abrasion resistance test in which high velocity air jets were blown for 3 hours at room temperature through a catalyst batch enclosed in a tube, and during which particles finer than 20 μm were permitted to escape to investigate the weight reduction as a result of attrition to the batch. In this test, catalyst II sustained a weight loss of 0.43 weight%/hour on average and the standard catalyst sustained a weight loss of 0.4 weight%/hour on average. Hence, the attrition resistance of the two catalysts was essentially the same.

EXAMPLE 4

By mixing silica, zeolite NaY, kaolin, sulfuric acid and aluminium sulfate, spray-drying the mixture and then ion-exchanging the spray-dried material as described in Example 3, a catalyst material was prepared containing about 36 %wt zeolite RE-Y, the remainder being amorphous alumina-silica and kaolin. The catalyst material contained 6.3 %wt $RE_2O_3$ (RE=rare earth metals), 61.8 %wt $SiO_2$ and 31.9 %wt $Al_2O_3$. The spray-drying was carried out in such a way that the mean particle size of the obtained catalyst material became about 125 μm and the particle size range from about 80 to about 160 μm. This catalyst material was then used as a coarse particulate fraction in producing a catalyst (A) according to the invention.

The same method was used for producing a fine particulate fraction having a mean particle size of about 45 μm and a particle size range of from 20 to about 80 μm. In this case, however, the zeolite NaY was omitted. This fine particulate fraction contained 62.5 %wt $SiO_2$ and 37.5 %wt $Al_2O_3$.

The attrition resistance of the two catalyst fractions was found to be 0.33 %wt/h on average for the coarse and 0.36 %wt/h on average for the fine particulate fraction, measured as disclosed in Example 3.

The coarse and fine particulate catalyst fractions thus prepared were mixed in weight proportions 1:1 so that the mixed catalyst (A) contained in total 62.15 %wt $SiO_2$, 34.7 %wt $Al_2O_3$ and 3.15 %wt $RE_2O_3$, the average content of zeolite RE-Y in the catalyst mass being about 18 %wt.

By mixing silica, zeolite NaY, kaolin, sulfuric acid and aluminium sulfate, spray-drying the mixture and then ion-exchanging the spray-dried material as described in Example 3, a comparison catalyst B was prepared containing about 18 %wt zeolite RE-Y, the remainder being amorphous alumina-silica and kaolin. This catalyst material contained about 3.3 %wt $RE_2O_3$, about 62 %wt $SiO_2$ and about 34.7 %wt $Al_2O_3$. The spray-drying was carried out in such a way that the mean particle size became about 65 μm and the particle size range from about 20 to about 150 μm.

The catalysts A and B thus prepared were then used as catalysts in a fluid catalytic cracker which was a pilot plant cracker and was charged with 35 g catalyst. Each catalyst was first steam treated in 100% steam at a pressure of about 100 kPa and a temperature of 750° C. during 5 h for aging the catalyst before using it in the reactor of the cracker for repeated cracking and regeneration cycles.

As feedstock for feeding the reactor during these tests a metal rich fuel oil was used having the following properties:

| | |
|---|---|
| sulfur content | 2.4% wt |
| viscosity at 100° C. | 16 cSt |
| density at 15° C. | 0.957 g/cm$^3$ |
| nickel content | 60 ppm by weight |
| vanadium content | 295 ppm by weight |

-continued

| | |
|---|---|
| Ramsbottom carbon content | 10.1% wt |

After the catalyst (A or B) being tested had been aged as described above, the feedstock preheated to 60° C. was fed to the reactor to be distributed throughout the fluidized catalyst bed at the bottom section of the reactor. The reactor was on stream for about 5 minutes to crack the feedstock under the reaction cycle conditions:

| | |
|---|---|
| weight ratio catalyst/oil | 2.0:1 |
| temperature, (°C.) | 482 |
| weight hourly space velocity, (weight oil per weight catalyst and per hour) | 6.0 |

After each period of cracking the used catalyst was stripped with nitrogen and the reactor temperature was increased to the regeneration temperature 710° C. The regeneration was performed by blowing air through the catalyst for 30 minutes. The catalyst being thus freed from carbon deposits was then cooled in the reactor to the normal cracking temperature 482° C., the cycle being then repeated.

At substantially regular intervals catalyst samples were drawn from the catalyst bed to determine metal content, activity and selectivity by micro activity tests (MAT-examination). In these tests it was found that the metal deposit was about 200 ppm metals per cycle or about 4000 ppm per day. The results of the MAT-examination are shown on the drawing showing the conversion as a function of the combined nickel and vanadium content of the catalyst. From the diagram it clearly appears that the catalyst A according to the invention retained its activity and resisted to metal poisoning to a substantially higher degree than the prior art homogeneously composed catalyst B at the same total zeolite content in the two catalysts. After about 4 days the conversion had decreased by about 10% for catalyst A and by as much as about 28% for catalyst B. This result shows very clearly the increased stability of the catalyst according to the present invention.

We claim:

1. A metal-poisoning-resistant cracking catalyst for hydrocarbons in a fluidized bed catalytic cracker, the catalyst being particulate and having a particle size and particle size distribution suitable for the contemplated purpose and for fluidization, said catalyst including two components, the first component being an active cracking catalyst and containing a zeolite material as a cracking catalyst and the second component being of a different chemical composition than said first component and being relatively inactive as a cracking catalyst as compared to said first component, said first and said second components being intermixed, said first and second components comprising particle fractions of different particle size and different chemical composition, said first component constituting the coarser particle size fractions and having a mean particle size of from about 80 to about 125 μm, and at least the major portion of said second component consisting of finer particle size functions as compared to said first component and having a mean particle size of from about 30 to about 75 μm.

2. The catalyst of claim 1, wherein the first component has a mean particle size of from 80 to 100 μm and the second component has a mean particle size of from 30 to 60 μm.

3. The catalyst of claim 1 wherein the zeolite material content in the first component is such that the catalyst as whole has a zeolite content of up to 50 weight %.

4. The catalyst of claim 1 wherein the first component has a zeolite content of at least 20 weight %.

5. The catalyst of any one of claims 1 or 2 wherein the second component consists of particles having a matrix of kaolin and amorphous alumina-silica.

6. A metal-poisoning-resistant cracking catalyst for hydrocarbons in a fluidized bed catalylic cracker, the catalyst being particulate and for fluidization, said catalyst including two components, the first component being an active cracking catalyst having a zeolite content of at least 20% and the second component consisting of particles having a matrix of kaolin and amorphous alumina-silica and being relatively inactive as a cracking catalyst as compared to said first component, said first and second components being intermixed and having a zeolite content in the catalyst as a whole of up to 50%, said first component having a mean particle size of from 80 to 125 μm and the second component having a mean particle size of from 30 to 75 μm, and said second component including a substance having CO conversion capacity.

7. The catalyst of claim 6, wherein said substance having CO conversion capacity is selected from the class consisting of platinum and palladium.

8. A metal-poisoning-resistant cracking catalyst for hydrocarbons in a fluidized bed catalylic cracker, the catalyst being particulate and for fluidization, said catalyst including two components, the first component being an active cracking catalyst having a zeolite content of at least 20% and the second component consisting of particles having a matrix of kaolin and amorphous alumina-silica and being relatively inactive as a cracking catalyst as compared to said first component, said first and second components being intermixed and having a zeolite content in the catalyst as a whole of up to 50%, said first component having a mean particle size of from 80 to 125 μm and the second component having a mean particle size of from 30 to 75 μm, and said second component including an additive for eliminating sulfur oxides.

9. The catalyst of claim 8, wherein said additive for eliminating sulfur oxides is selected from the class consisting of $Al_2O_3$, CaO and MgO.

* * * * *